United States Patent [19]

Wood

[11] 4,208,435
[45] Jun. 17, 1980

[54] CHILE RELLENOS AND PROCESS OF MAKING THE SAME

[76] Inventor: Betty J. Wood, P.O. Box 910, Norman, Okla. 73070

[21] Appl. No.: 941,250

[22] Filed: Sep. 11, 1978

Related U.S. Application Data

[63] Continuation of Ser. No. 821,143, Aug. 2, 1977, abandoned, which is a continuation of Ser. No. 720,600, Sep. 7, 1976, abandoned.

[51] Int. Cl.² ............................................. A23L 1/212
[52] U.S. Cl. ...................................... 426/92; 426/94; 426/95; 426/291; 426/102
[58] Field of Search .................................. 426/90–95, 426/102, 104, 134, 138, 282, 284, 291, 293, 295, 296, 302, 583, 615, 646, 438, 481, 482, 512, 513, 524, 803, 555

[56] References Cited

U.S. PATENT DOCUMENTS

| | | | |
|---|---|---|---|
| 1,438,467 | 12/1922 | Walden | 426/482 |
| 3,078,172 | 2/1963 | Libby | 426/438 |
| 3,235,385 | 2/1966 | Cull | 426/555 |

OTHER PUBLICATIONS

*The Complete Book of Mexican Cooking,* Ortiz, pp. 192–193 and 252–253, Bantom Book Inc., N.Y. 1967.

*Primary Examiner*—Joseph M. Golian
*Assistant Examiner*—Elizabeth A. Hatcher

[57] ABSTRACT

An improved Chile Relleno comprising a peeled and stuffed pepper having its surface rolled in cracker meal and coated with a batter consisting essentially of buttermilk, said buttermilk batter serving to bond, seal and adsorb the crackermeal coating, and method of making the same.

3 Claims, 11 Drawing Figures

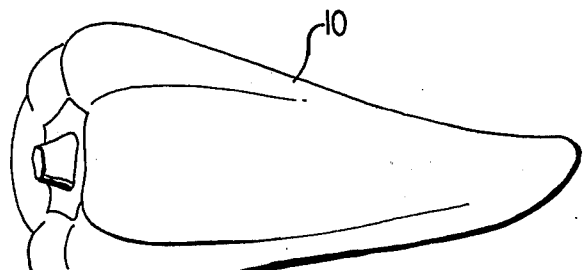
FIG. 1
FRESH PEPPER
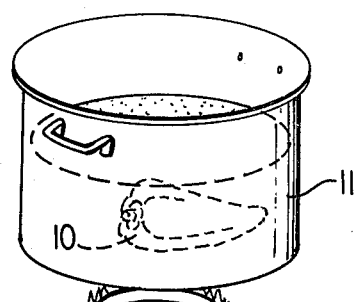
FIG. 2
COOK IN HOT PEANUT OIL
FIG. 3
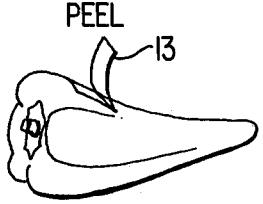
PEEL
FIG. 4
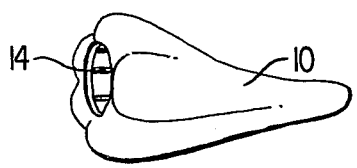
STUFF
FIG. 5
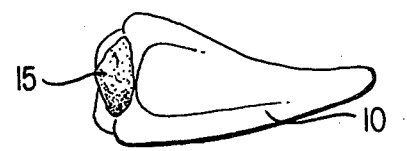
FLASH FREEZE
FIG. 6
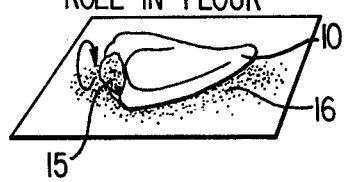
ROLL IN FLOUR
FIG. 7
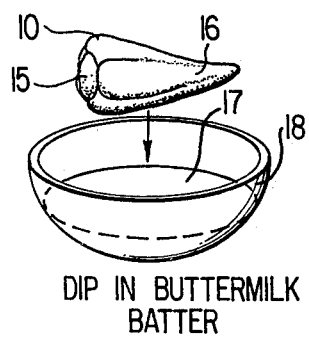
DIP IN BUTTERMILK BATTER
FIG. 8
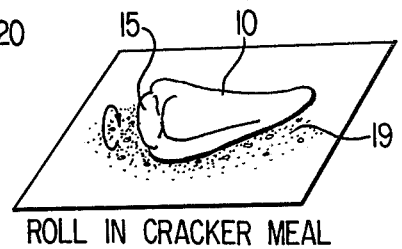
ROLL IN CRACKER MEAL AND FREEZE
FIG. 9
PACKAGE
FIG. 11
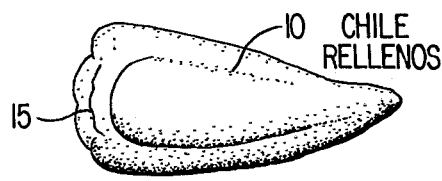
CHILE RELLENOS
FIG. 10
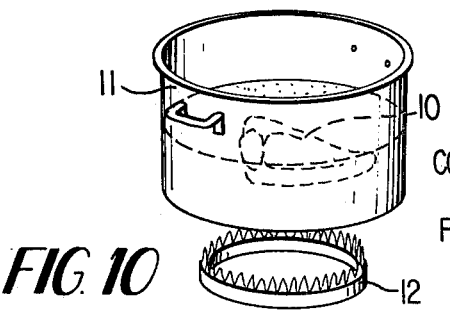
COOK IN DEEP FRYER

CHILE RELLENOS AND PROCESS OF MAKING THE SAME

RELATED APPLICATIONS

This application is a continuation of my application Ser. No. 821,143 filed Aug. 2, 1977, which is a continuation of my earlier application Ser. No. 720,600 filed Sept. 7, 1976 both now abandoned.

BACKGROUND OF THE INVENTION

I am aware that fresh peppers have been stuffed with suitable ingredients and sold as Chile Rellenos. I am also aware that confectionary products such as ice cream, candy and the like have been molded on a stick which serves as a handle. Various filler ingredients or compositions have been used for stuffing peppers and the like but no one, so far as I am aware, has used the particular ingredients herein set forth including meat, cheese and spices, with which may be included chopped peppers. Additionally my process includes the novel step of repeatedly rolling the molded product in flour, cracker meal, bread crumbs and the like, and after each operation dipping in a batter consisting essentially buttermilk. Previous batters used have included eggs rather than buttermilk but I have found a buttermilk batter is much superior to batters formed with either eggs or sweet milk, because the buttermilk batter more effectively holds the cracker meal or similar coating to the product, when it is deep fat fried, than other batters of which I am aware. A Chile Rellenos which is dipped in egg batter and rolled in cracker meal coating tends to lose its coating when deep fat fried.

My process also includes repeated flash freezing before and after the treatments with the crumbs and/or flour, and the batter. This treatment has proved satisfactory for use with various food items distributed on a commercial basis. Other distinctive features and advantages will be apparent from the accompanying drawing, detailed description and claims.

BRIEF DESCRIPTION OF THE DRAWINGS

In the drawings:
FIGS. 1 to 11 set forth diagrammatically successive steps in the treatment of a fresh pepper to and including the final Chile Rellanos product in a form ready to eat.

DETAILED DESCRIPTION OF THE PREFERRED EMBODIMENT

In FIGS. 1 to 11 inclusive, successive steps in making my improved product are set forth diagrammatically, beginning with a fresh pepper and ending with a complete product which is ready to eat and which may be termed a Chile Relleno.

A fresh pepper 10 as shown in FIG. 1 which is preferably green and of the Anaheim pepper variety, but in some instances may be red, is first cooked in hot peanut oil at approximately 400° F. in a suitable vessel 11, heated by a burner 12 as indicated in FIG. 2. The heating is continued until the skin is loosened from the pepper and is ready for removal. The hot peanut oil within a few minutes turns the pepper a silvery brown color showing that the peel 13 is ready for removal as indicated in FIG. 3. At the same time that the peel is loosened, the oil has cooked the pepper so that an internal portion 14 may be readily removed as indicated in FIG. 4, to permit insertion of a suitable filler composition 15 as indicated in FIG. 5. After stuffing with the filler 15, the stuffed pepper is flash frozen as indicated in FIG. 5, and is subsequently rolled in flour 16 as indicated in FIG. 6. Thereafter the flour coated frozen stuffed pepper is dipped in buttermilk batter 17 in a suitable container 18 as shown in FIG. 7, after which the buttermilk coated pepper is rolled in cracker meal and is again flash frozen (FIG. 8). It is then ready to be inserted, in a frozen state, in a package 20 which should be kept frozen until the product is to be prepared for use. The still frozen product 10 is then removed from the container 20 and is again cooked in a deep fryer in peanut oil as indicated in FIG. 10 whereupon the final product which is referred to as Chile Rellenos as shown in FIG. 11 is ready for use.

INGREDIENTS

(A) FILLER INGREDIENTS (1) For Chile Rellenos the principal filler ingredients are:
(a) ground meat such as beef, pork, lamb or poultry but preferably beef;
(b) cheese of any suitable variety such as Swiss cheese or cheddar cheese, and if desired any type of soft cheese may be included;
(c) spices such as garlic, salt, comino, oregano and black pepper.

Other ingredients such as onions, MSG and tomato juice may be included together with water and cracker meal.

(B) DIPPING BATTER

The dipping batter is essentially buttermilk, the use of which is a distinctive feature of the invention.

The dipping batter may include the following ingredients: cultured lowfat milk, sweet cream butter, nonfat dry milk, solids, salt, food grade starch, gelatin, guar gum and diacetyl.

(C) BREADING INGREDIENTS—CRACKER MEAL

SPECIFIC EXAMPLE

| SPECIFIC EXAMPLE | | |
|---|---|---|
| FILLER INGREDIENTS | LBS | PERCENT |
| Ground Beef | 300.000 | 60.000 |
| Cheese | 40.000 | 8.000 |
| Onions | 40.000 | 8.000 |
| Water | 34,375 | 6.875 |
| Cracker Meal | 25.000 | 5.000 |
| Green Chile (Peppers, Chopped) | 20.000 | 4.000 |
| Tomato Juice | 20.000 | 4.000 |
| Jalapeno Peppers (Chopped) | 12,500 | 2.500 |
| MSG | 2.500 | .500 |
| Garlic | 1,875 | .375 |
| Salt | 1,250 | .250 |
| Comino | 1,250 | .250 |
| Oregano | .625 | .125 |
| Black Pepper | .625 | .125 |
| Total | 500.000 | 100.000 |
| BATTER FORMULA | | |
| Buttermilk | 233.820 | 58.900 |
| Chopped Green Chiles (Peppers) | 100.320 | 26.400 |
| Water | 55.860 | 14.700 |
| Total | 380.000 | 100.000 |
| BREADING INGREDIENTS | | |
| Cracker Meal | | |

The chopped peppers may be omitted if desired.

DEEP FRYER 11, 12

For preliminarily treating the green pepper as set forth in FIG. 2 and for subsequently heating the frozen molded product 10, 104 before the same is ready to serve as in FIGS. 10 and 16, any suitable deep fryer 11, 12 may be employed which I term a Fryolator.

I preferably employ peanut oil as the frying ingredient at a temperature from about 350° F. to about 425° F. The time for treating the product is dependent on the temperature of the oil employed for deep frying. Good results have been obtained in the initial treatment of the green peppers (FIG. 2) to facilitate peeling by using peanut oil at a temperature of about 400° F. for about three minutes until the pepper turns a silvery brown color indicating that the peel has been loosened. For treating the frozen molded article 10 to prepare it for use, good results are obtained by first semi-thawing the frozen article and then frying it in deep fat at about 375° F. for about four minutes. When the completely frozen article is directly treated in deep fat without previously semi-thawing the same, six minutes may be required. Where a higher temperature of about 400° F. is employed, the time of treatment may be reduced to about three minutes or even less if the molded article is first semi-thawed. These periods of time may vary with the taste of the user and with other conditions.

BUTTERMILK BATTER

I have found that the buttermilk batter possesses unexpected advantages over other batters known to me as it serves to bond, seal, and adsorb a heavier cracker meal coating than other batters. The buttermilk coating, including the cracker meal, does not break loose in the Fryolator as have other batters tested. Also the oil in the Fryolator, after the peppers are cooked, shows no more use than when "French fries" are cooked.

The invention has been described in detail for the purpose of illustration but it will be obvious that numerous modifications and variations may be resorted to without departing from the spirit of the invention.

What is claimed is:

1. A method of forming an improved Chile Relleno which includes the step of heating a fresh green pepper in hot oil to cook the pepper and loosen the peel or skin, removing the peel, forming a cavity in the peeled pepper, and inserting a stuffing mix in the cavity, freezing the stuffed pepper product, rolling the same in flour, dipping the flour coated product in a batter consisting essentially of buttermilk, rolling the same in cracker meal, freezing and packing.

2. The method according to claim 1 wherein the frozen article is dipped in hot oil and served hot.

3. The product produced by the process of claim 1.

* * * * *